United States Patent [19]

Masaki et al.

[11] 4,040,737

[45] Aug. 9, 1977

[54] METHOD AND ARRANGEMENT FOR ELIMINATING GHOST IMAGE

[75] Inventors: Katsumi Masaki, Kodaira; Kazuhiro Hirayama, Yokohama; Yasushi Sato, Kawasaki; Yoichi Hirabayashi, Machida, all of Japan

[73] Assignee: Canon Kabushiki Kaisha, Tokyo, Japan

[21] Appl. No.: 616,629

[22] Filed: Sept. 25, 1975

[30] Foreign Application Priority Data

Jan. 28, 1975 Japan .................................. 50-11532

[51] Int. Cl.² ...................... G03B 27/48; G03B 27/50; G03B 27/70
[52] U.S. Cl. ..................................... 355/49; 346/108; 355/66
[58] Field of Search .......................... 355/49, 66, 31, 8; 346/108; 350/299; 250/574, 575, 230, 233

[56] References Cited

U.S. PATENT DOCUMENTS

| 2,234,717 | 3/1941 | Altman et al. | 355/49 |
| 2,331,113 | 10/1943 | Fassel | 355/49 X |
| 2,823,579 | 2/1958 | Fitter | 355/49 X |
| 3,867,571 | 2/1975 | Starkweather et al. | 358/256 |
| 3,898,627 | 8/1975 | Hooker et al. | 364/900 |
| 3,974,506 | 8/1976 | Starkweather | 346/900 |

Primary Examiner—Richard A. Wintercorn
Attorney, Agent, or Firm—Fitzpatrick, Cella, Harper & Scinto

[57] ABSTRACT

A method of eliminating a ghost image in an image forming process wherein a recording medium is scanned with a light beam reflected by a polygonal rotary mirror, and wherein the light beam for scanning is directed toward the rotary mirror along a path so that the angle between the path and the rotary axis of the rotary mirror is not equal to 90° so as to displace the ghost image formed on the recording medium to a position out of the scanning line on the recording medium.

17 Claims, 15 Drawing Figures

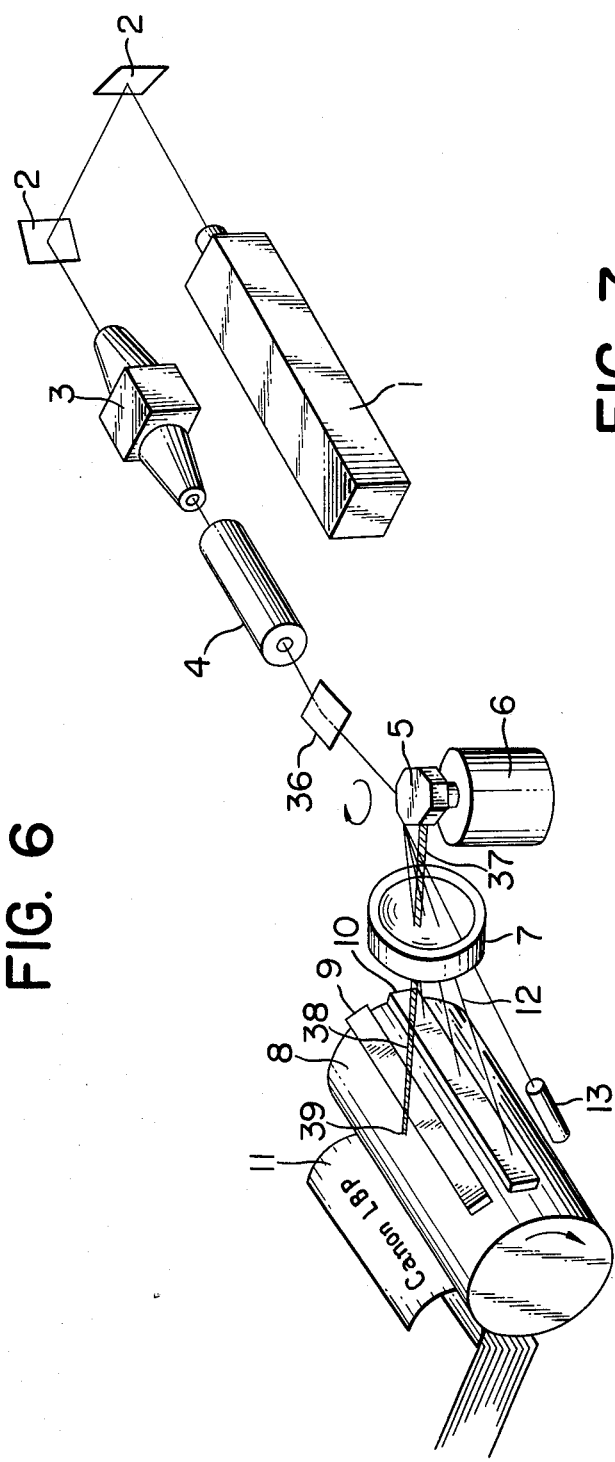
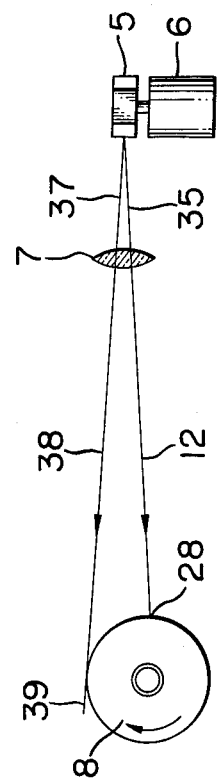
FIG. 6
FIG. 7

METHOD AND ARRANGEMENT FOR ELIMINATING GHOST IMAGE

BACKGROUND OF THE INVENTION

1. Field of the Invention

The present invention relates to a method and arrangement for eliminating a ghost image in image forming apparatus utilizing a light beam such as a laser beam, and more particularly a method for eliminating a ghost image which appears, in a laser recording apparatus utilizing a rotary mirror, on a recording medium such as a photosensitive element or display element.

2. Description of the Prior Art

In an image forming apparatus in which a light beam from a laser is recorded, the use of the laser beam as the light source and the optical processing applied thereto inevitably results in the formation of various ghost images along the light path of said laser beam and also on the surface of the elements involved in such optical processing. Most ghost images move on the surface of the recording medium with the scanning beam, and the intensity thereof integrated in time is very weak. In case, however, of the use of a rotary mirror such as a polygonal mirror as the beam scanner in combination with a focusing lens and a recording medium, there is formed a stationary ghost image in spite of the fact that the laser beam is continuously moving. According to the intensity of the laser beam, such a ghost image will be provided with a significantly high time-integrated intensity and will therefore be rendered visible upon the formation of the image. Also if such a ghost image is avoided in a direction parallel to the scanning direction of said beam, the effective width of the recording medium becomes inevitably limited. In this manner, stated otherwise, there will inevitably be a limitation in the dimension of the recording medium or of the image to be formed thereon.

SUMMARY OF THE INVENTION

The principal object of the present invention is to prevent the undesirable effect on the image formation by the ghost image resulting from the use of a polygonal mirror as a beam scanner.

Another object of the present invention is to displace the ghost image formed on the recording medium such as a photosensitive element due to the use of a polygonal mirror as a beam scanner to a position outside said recording medium or to a position thereon of less detrimental influence.

A still another object of the present invention is to displace the ghost image resulting from the use of a polygonal mirror as a beam scanner in a direction toward said recording medium different from the beam scanning direction thereby avoiding the limitation on the effective width of said recording medium.

Other objects of the present invention will be clarified in the following detailed description.

The above-mentioned recording medium includes not only conventional layer-structured photosensitive elements but also photosensitive screens provided with a plurality of minute openings for modulating ion current or colored particles passing therethrough, and further various display elements. Also the term 'rotary mirror' in the present specification includes a mirror performing a reciprocating movement along an axis.

The above-mentioned objects of the present invention can be achieved by directing, in an image forming apparatus wherein the scanning with a light beam is performed by a polygonal rotary mirror, said light beam to said rotary mirror in such a way that the angle $\theta$ between the rotary axis of said rotary mirror and said light beam satisfies a condition $\theta \neq 90°$.

BRIEF DESCRIPTION OF THE DRAWINGS

FIG. 6 is a schematic perspective view of an example of the basic arrangement of a laser recording apparatus representing an embodiment of the present invention.

FIG. 7 is a schematic side elevational view of the recording apparatus shown showing FIG. 6 in the beam scanning function thereof.

FIGS. 10, 11 and 12 are perspective views of the recording apparatus showing the beam scanning function thereof representing embodiments of a masking element for interrupting the projection of the ghost image onto the recording medium wherein FIG. 10 shows an embodiment with two oblong masking elements arranged in said scanning direction, FIG. 11 shows an embodiment with one masking element arranged in said scanning direction and FIG. 12 shows an embodiment with a masking element which is vertically and horizontally adjustable.

DESCRIPTION OF THE PREFERRED EMBODIMENTS

For the purpose of clarifying the nature of the present invention, an explanation will be given of a recording apparatus utilizing a laser beam and to the cause of the formation of a stationary ghost image on the recording medium in such an apparatus.

Figure 1:
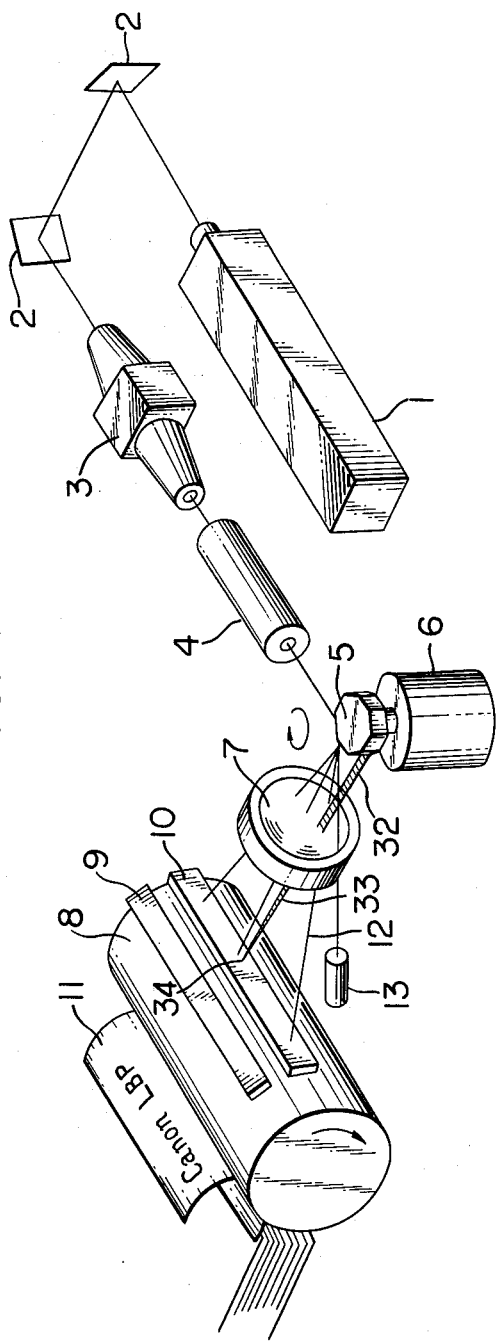
FIG. 1 is a schematic perspective view of an example of the basic arrangement of a laser recording apparatus.

With respect to FIG. 1 giving a schematic perspective view of an example of the basic arrangement of a laser recording apparatus, a laser beam generated by a laser oscillator 1 is introduced through a mirror 2 to a modulator 3. Said mirror 2 is inserted in order to deflect the light path for the sole purpose of reducing the space of the apparatus and may be eliminated if such purpose is not necessary. Said modulator 3, consisting of an acousto-optical element utilizing the already known acousto-optical effect or an electro-optical element also utilizing the already known electro-optical effect, modulates the intensity of said laser beam in response to an input signal supplied to said modulator 3.

In case said laser oscillator is a semi-conductor laser or an internal modulation gas laser capable of current modulation or provided with a modulating element in the oscillating system thereof, said modulator 3 is dispensed with and the laser beam is directly guided to a beam expander 4. The laser beam from said modulator is subjected, by means of said beam expander 4, to an enlargement of the beam diameter without distorting the parallel beam, and, the thus enlarged diameter is guided to a polygonal rotary mirror 5 provided with one or more mirror faces and mounted on a shaft supported by a bearing of high precision (for example pneumatic) for rotation in the arrow direction at a constant speed by means of a motor 6 (for example a hysteresis synchronous motor, DC servo-motor etc.). The laser beam 12 thus performs a horizontal sweeping movement by means of said rotary mirror 5 and is focused as a spot on a photosensitive drum 8 by means of a focusing lens 7 provided with '$f - \theta$' characteristics to be explained herein-after. For an ordinary focusing lens with a focal length f, the imaging position r on the focal plane can generally be expressed in terms of the incident angle $\theta$ as follows:

$$r = f \cdot \tan \theta \qquad (1)$$

In case of a laser beam reflected by a polygonal rotary mirror 5 of a constant rotation speed as contemplated herein, the incident angle $\theta$ of said laser beam 12 into the focusing lens 7 is a first-order function of time. Consequently the displacing speed of the spot focused on the photosensitive drum 8 varies non-linearly and increases when the incident angle becomes large. Thus a pulsed laser beam of constant interval will give rise to a row of spots on the photosensitive drum in which the interval between spots is wider at both end portions than in the center.

In order to prevent the above-mentioned phenomenon the focusing lens 7 is designed so as to satisfy the following requirement:

$$r = f \cdot \theta \qquad (2)$$

and such lens is called a lens with '$f - \theta$' characteristics.

For focusing a parallel light beam into a spot by means of a lens, the minimum spot diameter $d_{min}$ is defined by the following relation:

$$d_{min} = f(\lambda/A) \qquad (3)$$

wherein $f$ is the focal length of the lens, $\lambda$ is the wavelength of the light used in focusing and $A$ is the incident aperture of the lens, and thus a smaller spot diameter $d_{min}$ can be reached by increasing the value of $A$ for given values of $f$ and $\lambda$. The aforementioned beam expander 4 is employed for this reason and can be omitted if a desirable value of $d_{min}$ is attainable with the beam diameter of the laser oscillator.

The beam detector 13 is composed of a photoelectric transducer provided with a small incident slit and a short response time (for example, a PIN diode) and is used for detecting the position of the laser beam 12 in sweeping movement, wherein the detection signal determines the timing of the input signal to the modulator 3 for supplying desired optical information to the photosensitive drum. Such an arrangement significantly compensates for the errors in the precision of the reflecting surfaces of the polygonal rotary mirror 5 and in the horizontal synchronization of signals, thus assuring an image of high quality and allowing a larger tolerance in the precision required for said rotary polygonal mirror 5 and drive motor 6, thus reducing the manufacturing cost.

As explained in the foregoing the photosensitive drum 8 is irradiated by the deflected and modulated laser beam 12, and the obtained image is rendered visible by an electrophotographic process, then transferred and fixed on a plain paper to obtain a hard copy.

The photosensitive drum 8 and the imaging process employed in the above-mentioned example correspond to a process for producing latent image disclosed in U.S. Pat. No. 3,666,363 wherein a photosensitive element of a three-layer structure composed of a photoconductive layer and a surface insulating layer provided on an electroconductive substrate is subjected to a first charging step, and then to a second charging step substantially simultaneous with imagewise exposure eventually followed by a uniform exposure step thereby forming a latent image thereon. For this purpose in FIG. 1 there is shown a first corona discharge device 9 for said first charging step and a second corona discharge device 10 the rear portion of which is optically open for said second charging step. However said photosensitive drum 8 is not necessarily limited to such an embodiment but can also be composed of photosensitive elements of a conventional two-layer structure or containing four or more layers or aforementioned photosensitive screens, and further can be of any other recording medium including display screens.

Figure 2A:
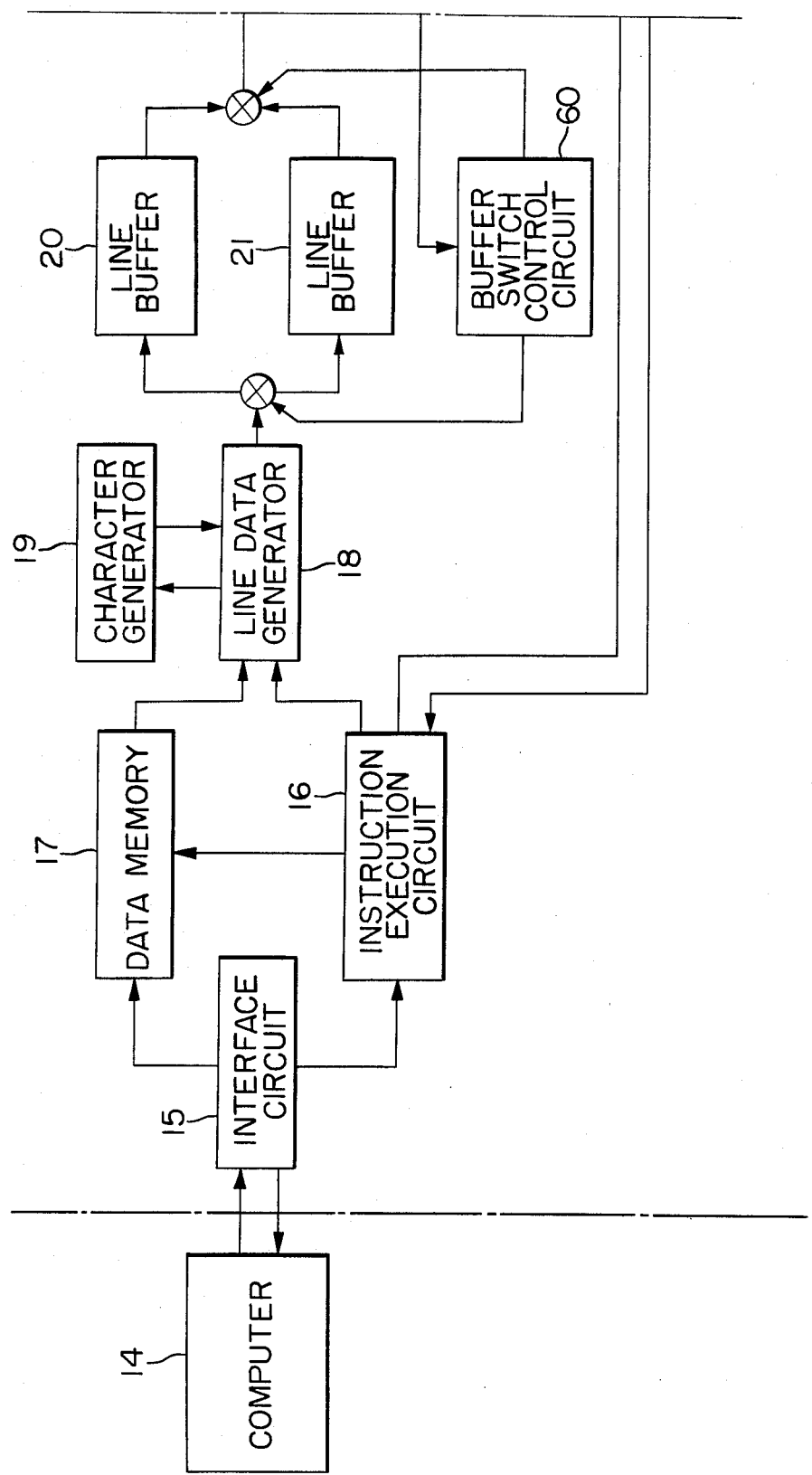
FIG. 2, 2A and B are block diagrams indicating the components of the apparatus shown in FIG. 1 for obtaining a hard copy.
Figure 2B:
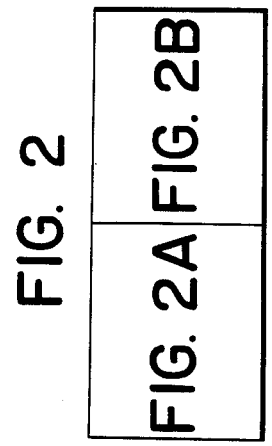
Figure 2B:
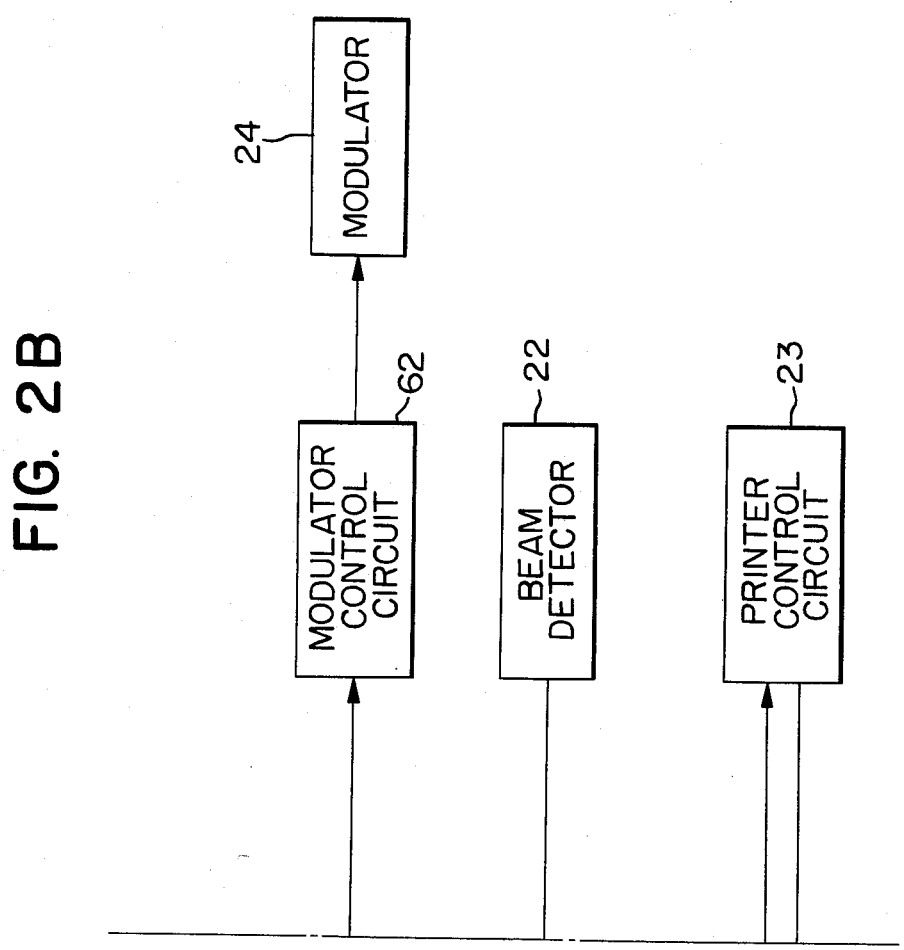

In the following explanation, with particular reference to FIG. 2, are the components of the apparatus of the present embodiment for preparing a hard copy of the graphic or character information supplied from a computer. The information from a computer 14 is supplied, either directly or through a memory medium such as a magnetic tape or a magnetic disc, in a predetermined format to an interface circuit 15 of the present apparatus. Various instructions from the computer 14 is decoded and executed by an instruction execution circuit 16, while various bits of data are stored in predetermined quantities in a data memory 17. The character information is given in the form of binary codes while graphic information is given either as graphic unit data constituting the graphic pattern or as graphic line data (so-called vector data) constituting said graphic pattern. Such data formats are instructed in advance of the input of such data, and said instruction execution circuit 16 controls the data memory 17 and a line data generator 18 so that the bits of input data are processed according to said instructed mode. Said line data generator 18 generates completed data for one scanning line. In case the data is given in the form of character code, said line data generator 18 either reads character patterns from a character generator 19 and stores character patterns for a line in a buffer memory or stores character codes for a line in a buffer memory and reads character patterns in successive order from said character generator 19 thereby releasing data for modulating the laser beam for one scanning line. In case the data are given in the form of graphic information, said data are similarly converted into scanning line data and released in the form for modulating the laser beam for one scanning line. Said data for one scanning line are stored in a line buffer 20 and another line buffer 21, which are composed of shift registers provided respectively with bit capacity equal to the number of pictorial units in one scanning line, alternately by means of a buffer switch control circuit.

Figure 3:
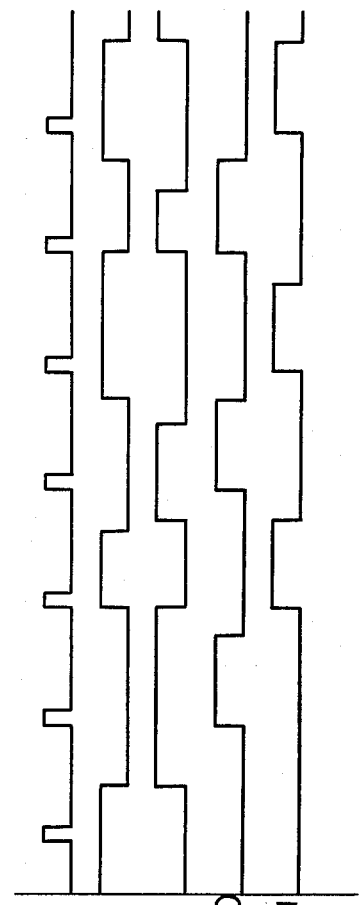
FIG. 3 is a signal diagram indicating the time-dependent function of the buffer switch control circuit.

The data thus stored in said line buffers 20 and 21 are read in successive order upon being triggered by the beam detection signal from the beam detector 13, and the data for one scanning line are applied, bit after bit, to a modulator control circuit 60. In this manner the data for one scanning line stored in said line buffer are applied to the modulator 3 while a reflecting surface of said rotary mirror performs a scanning movement on the photosensitive drum along a line perpendicular to the direction of rotation thereof, thereby supplying the light intensity pattern for one scanning line to said photosensitive drum 8. The read-out operation is made alternately from the line buffer 20 and from the line buffer 21 by the control of the buffer switch control circuit 62. As shown in FIG. 3, one line buffer performs a write-in operation while the other performs a read-out operation. In this manner the data can be supplied to the modulator without interruption even when a reflecting surface is located very close to the succeeding surface on said polygonal rotary mirror for scanning the photosensitive drum.

A printer control circuit 23, upon reception of a start instruction from the instruction execution circuit 16, returns thereto a 'printer ready' signal. Thus, when the data are supplied to the modulator 3 and the first data of a page is recorded on the photosensitive drum, a recording sheet 11 is advanced by a paper feed mechanism already known in copying machines or printing machines at a timing so as that said recorded data are transferred, at the transfer station, to the top portion of said recording sheet. In this manner the character and graphic information obtained from a computer is obtained in a form of clear hard copy on a plain paper sheet.

As thus far explained, the apparatus of the above-mentioned embodiment enables one to obtain character and graphic information from a data control system such as a computer in the form of a hard copy of a high resolution and at a fast speed which was never attainable with conventional printers. However, a laser recording apparatus with scanning function as explained above is inevitably associated with the formation on the recording medium of a stationary ghost image, which, if present on the image recording area, is also rendered visible along with the desired image.

The cause of the formation of such a ghost image will be explained below with particular reference to FIGS. 4 and 5, and an explanation will be given as to the method of preventing the undesirable effects of such a ghost image.

Figure 4:
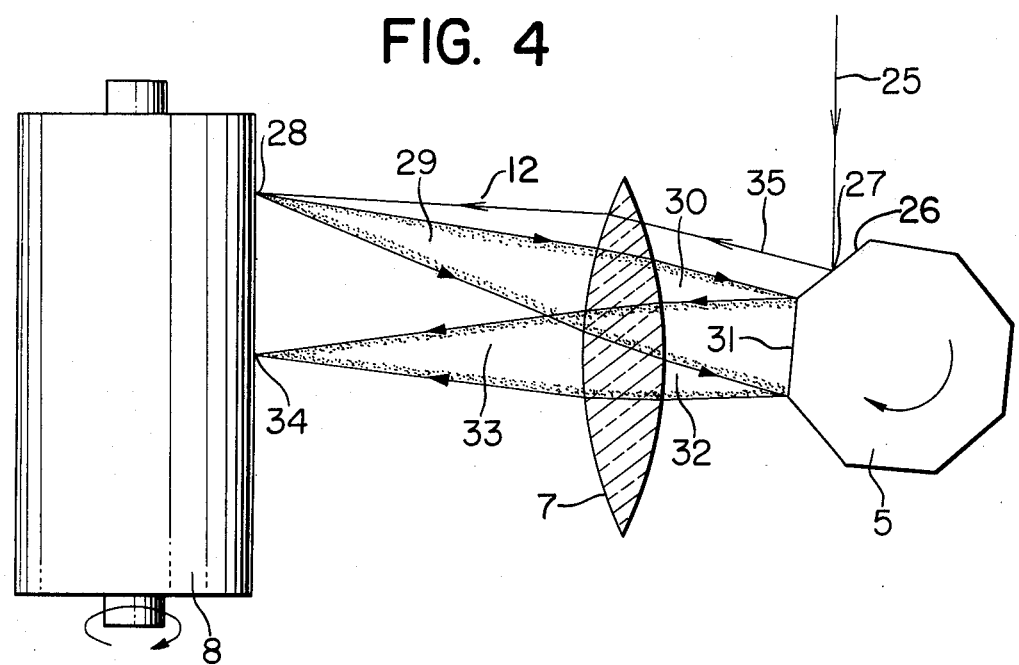
FIGS. 4 and 5 are schematic drawings indicating how a stationary ghost image is formed.
Figure 5:
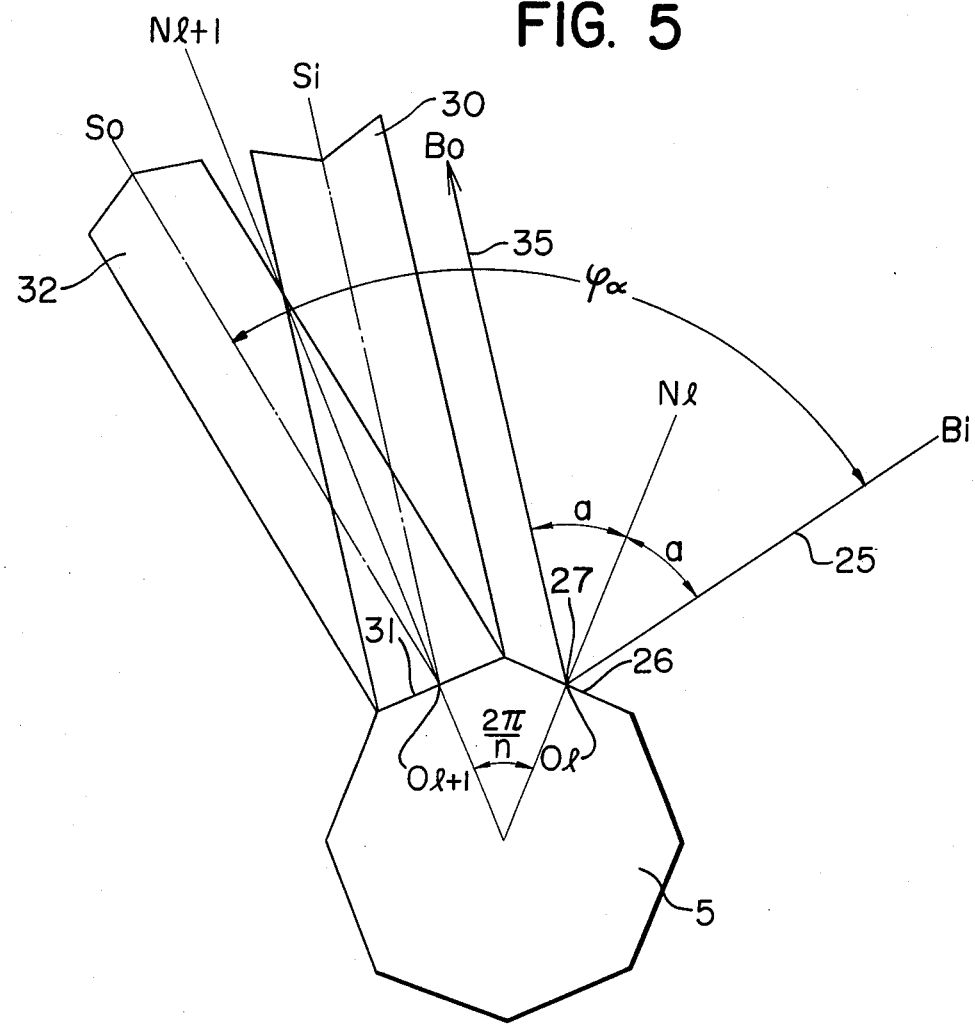

FIG. 4 schematically shows the relative arrangement of the rotary mirror 5, imaging lens 7 and photosensitive drum 8, in which the arrow 25 indicates the path of laser beam generated by the aforementioned incident laser oscillator 1. The laser beam 25 resulting from the beam expander 4 in FIG. 1 is directed to the polygonal rotary mirror 5 rotating in the arrow direction, and is reflected at a point 27 on the $l$-th surface 26 of said rotary mirror from which said beam 25 is directed to the lens 7 and focused on a point (image point) 28 on the photosensitive drum 8 thereby realizing the exposure of desired image thereon. At the same time said image point 28 produces reflected (or scattered) light in every direction. A weak portion 29 of the thus reflected laser light reaches the lens 7, is converted into a parallel flux 30 and reaches the aforementioned rotary mirror 5. Said light is therefore reflected by the $(l + 1)$th surface 31 of said rotary mirror adjacent to the surface 26 thereof to form a parallel flux 32 which reaches again the lens 7 and is again focused thereby on a point 34 on said photosensitive drum 8 to form a stationary ghost image.

How said ghost image remains in a stationary position despite of the rotation of the rotary mirror 5 will be clarified in the following explanation with reference to FIG. 5.

Supposing that said polygonal rotary mirror is composed of n surfaces, the angle between the normal line of the $l$-th surface and that of $(l + 1)$th surface is $2\pi/n$. Consequently the angle between the laser beam 35 resulting from the reflection of the incident laser beam 25 and the normal line of the $(l + 1)$th surface is represented by:

$$(2\pi/n) - \angle B_oO_lN_l = (2\pi/n) - a = \angle S_iO_{l+1}N_{l+1}$$

wherein $\angle B_oO_lN_l$ (hereinafter represented as $a$) is an angle between the beam 35 and the normal line of the $l$-th surface 26, and $\angle S_iO_{l+1}N_{l+1}$ is the angle between the parallel flux 30 and the normal line of the $(l + 1)$th surface 31.

Further, said parallel flux 30 is reflected into a direction forming an angle of $(2\pi/n - a)$ with respect to the normal line of the $(l + 1)$th surface 31. Consequently the angle $\phi_1$ of flux 32 with respect to the laser beam 25 is:

$$\phi_1 = \angle B_iO_lB_o + \angle S_iO_{l+1}S_o = 2a + 2(2\pi/n - a) = 4\pi/n = \text{constant}.$$

wherein $\angle B_iO_lB_o$ is the angle between the laser beam 25 and the beam 35 while $\angle S_iO_{l+1}S_o$ is the angle between the parallel flux 30 and the parallel flux 32. Thus the angle $\phi_1$ remains constant regardless of the value of $a$.

In the laser recording apparatus of the foregoing example wherein the laser beam is introduced into an octagonal rotary mirror and in a direction parallel to the axis of rotation of the photosensitive drum 8, a stationary ghost image is therefore formed at a point 34 corresponding to the angle $\phi_1 = \pi/2$.

In the foregoing explanation there was considered the reflection of the light scattered from a point 28 on the photosensitive drum 8 only by a mirror surface adjacent to the mirror surface receiving the laser beam. Assuming that a similar phenomenon appears also on another $(l + \alpha)$th mirror surface, of which normal line forms an angle of $2\alpha\pi/n$ with respect to that of the $l$-th surface, the angle $\phi_\alpha$ between the ghost light and the laser beam 25 is:

$$\phi_\alpha = 4\alpha\pi/n = \text{constant and said phenomenon again}$$

leads to the formation of another ghost image stationary on the photosensitive drum.

The position of such ghost image is represented in FIG. 1, wherein the fluxes 32 and 33 resulting from the rotary mirror correspond to the reflected light fluxes 32 and 33 in FIG. 4, with resulting stationary ghost image 34 on the trajectory of the image point of the scanning beam 12 on the photosensitive drum 8. Such ghost image is undesirable since it is also rendered visible on the final hard copy when the time-integrated energy thereof is large enough. With respect to FIGS. 4 and 5, though the laser beam 25 directed toward the rotary mirror 5 is simply expressed by a straight line, it will naturally be understood that such line represents the optical axis of an actual beam which has a certain determined diameter. In the following, there will be explained the method whereby such a ghost image may be diverted away from the scanning line.

FIG. 6 is a schematic perspective view of a laser recording apparatus representing an embodiment of the present invention wherein the components common with those in FIG. 1 are represented by the same numbers. In the present embodiment according to the present invention the laser beam directed toward the rotary mirror impinges thereon at an angle not equal to 90° with respect to the axis of rotation thereof. Consequently the scanning beam 12 reflected by said rotary mirror 5 is directed along a path not perpendicular to the axis of rotation of said rotary mirror 5, thereby enabling displacement of the ghost image, which is formed in a direction perpendicular to said axis of rotation as clarified in the foregoing explanation in relation with FIG. 4, to a position out of the scanning line of said beam 12. Also in this case the scattered light from the focusing point 28 of the scanning beam 12 on the photosensitive drum 8 is converted into parallel flux by means of the lens 7 as explained in FIG. 4, then reflected by the rotary mirror 5 and again focused by said lens 7 to form a ghost image on the photosensitive drum 8. In this case, however, the position of said ghost image does not exist on the trajectory of the scanning beam 12 on the photosensitive drum 8 due to the fact that the direction of said parallel flux resulting from the scattered light from said image point 28 is not perpendicular to the axis of rotation of said rotary mirror. Such ghost image, therefore, does not give any undesirable effect on the photosensitive drum 8 if the position thereof is not present in the recording area of said photosensitive drum 8, or can be interrupted by a suitable masking element even if the position thereof falls in said recording area but does not overlaps with said scanning beam 12. Such masking element can be conveniently employed according to the intensity of the laser beam to be employed. In the embodiment of FIG. 6, the laser beam is deflected so that the direction thereof is not perpendicular to the rotary axis of the rotary mirror 5 and the photosensitive drum 8 is displaced correspondingly to the focusing position of the scanning beam 12 in order to eliminate the undesirable effect of the ghost image. Such a deflection of the laser beam is realized in the present embodiment by a reflecting mirror 36, but it is also possible to use another reflecting or refracting means such as a prism or to displace the laser oscillator itself from the horizontal position. It is further possible to incline the rotary axis of said rotary mirror 5 thereby rendering the angle between the output beam from the beam expander and the rotary axis of said rotary mirror not equal to 90°. In FIG. 6 the laser light reflected from the rotary mirror 5 to the photosensitive drum 8 is represented by 37 and 38, and the ghost image is represented by 39. In FIG. 7 there is shown, in schematic lateral view, the relationship between the photosensitive drum 8, rotary mirror 5 and scanning beam 12 in the scanning position shown in FIG. 6.

Figure 8:
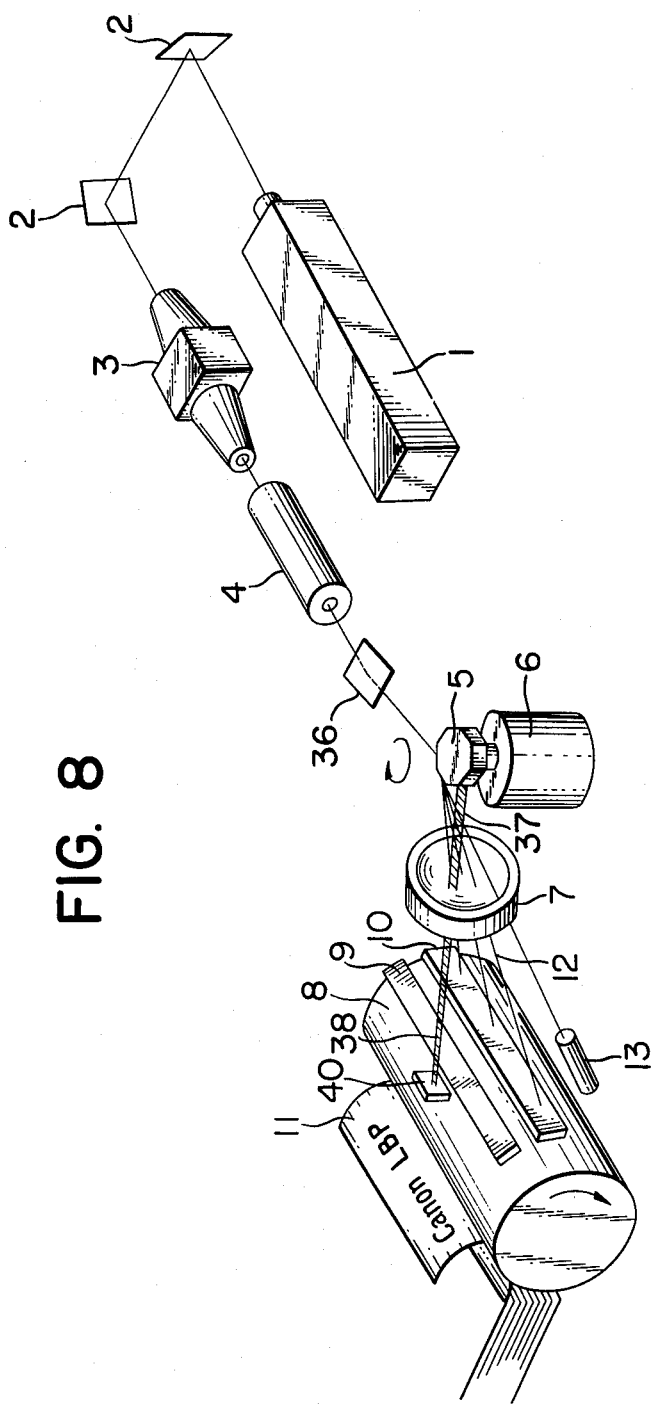
FIG. 8 is a schematic perspective view of an another embodiment of the present invention.
Figure 9:
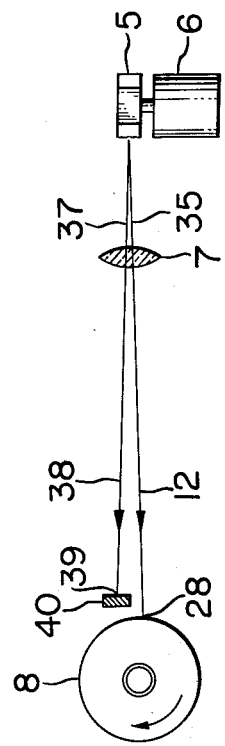
FIG. 9 is a schematic side elevational view of the recording apparatus shown showing FIG. 8 in the beam scanning function thereof.

FIG. 8 shows an another embodiment of the present invention wherein the ghost image is interrupted by means of a masking element 40 before reaching the photosensitive drum 8. The essential components therein are mostly common to those in FIG. 1 and are therefore represented by the same numbers. The embodiment of FIG. 8 is particularly effective for preventing any undesirable effects in case the ghost image 39 is positioned close to the scanning beam 12 or in case the ghost image is provided with an elevated intensity. FIG. 9 gives a schematic side elevational view of the apparatus shown in FIG. 8 in the scanning position thereof.

Figure 10:
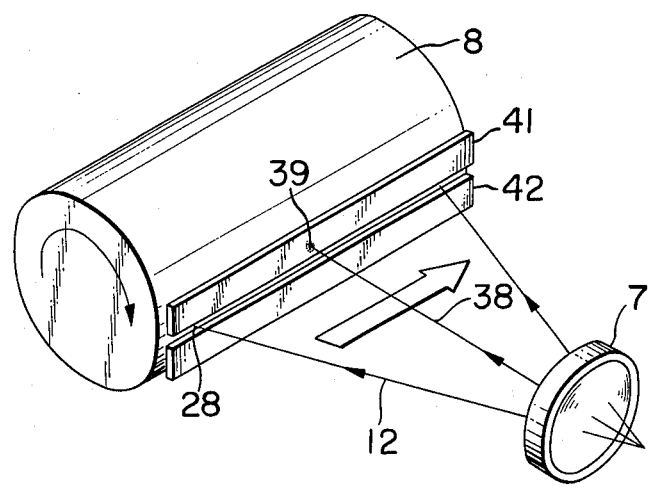
Figure 11:
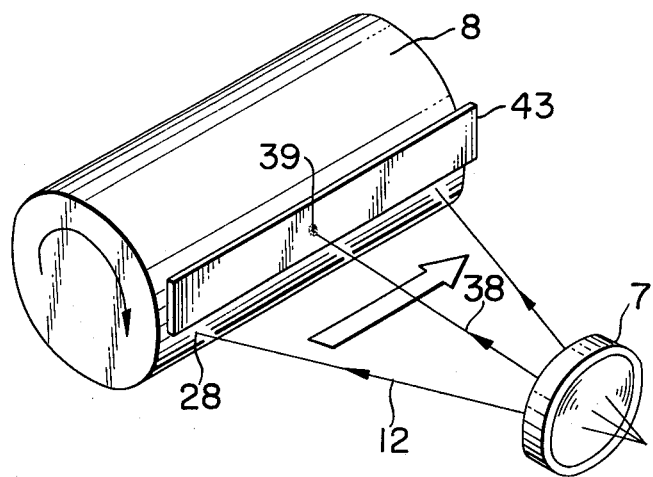
Figure 12:
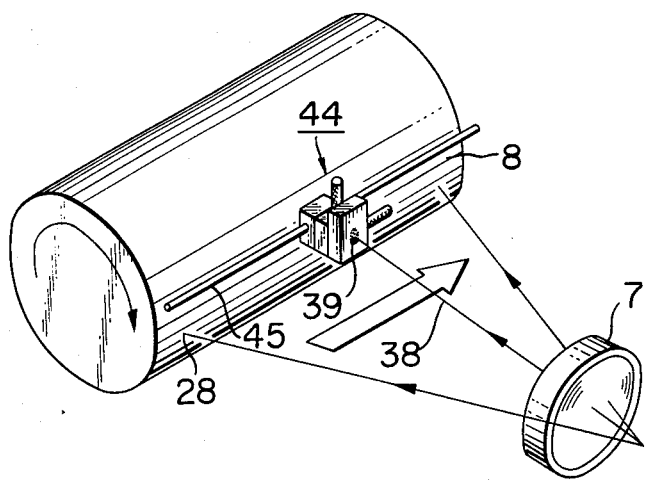

Various embodiments of the masking element 40 are represented in FIGS. 10 - 12 in schematic perspective views in the scanning position thereof. In an embodiment of FIG. 10, there are provided two fixed plate-shaped masking elements 41 and 42 above and below the scanning beam 12, which are effective for eliminating ghost images formed above and below the trajectory of said scanning beam. FIG. 11 shows another embodiment wherein a plate-shaped masking element 43 is provided above the scanning beam 12. Such plate-shaped masking elements as shown in FIGS. 10 and 11 do not require adjustment for the possible displacement of the ghost image in a direction parallel to the rotary axis of the photosensitive drum 8.

Figure 13:
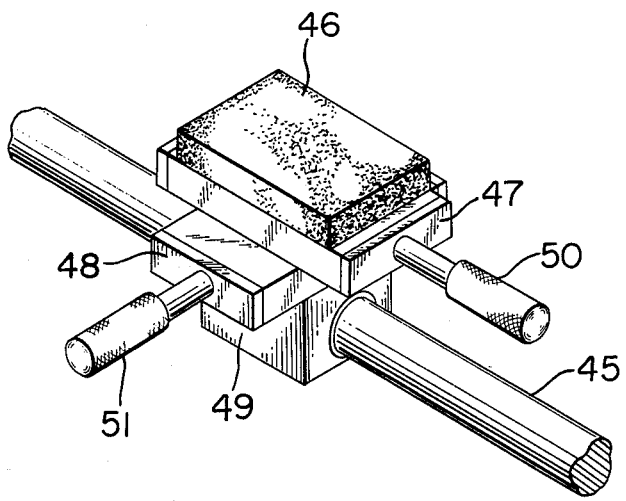
FIG. 13 is an enlarged perspective view of the masking element shown in FIG. 12.

FIG. 12 shows an improvement in the masking element of FIG. 8 wherein the masking element 44 is supported by a fixed supporting shaft 45 so that the position thereof is finely adjustable horizontally and vertically. Such masking element 44 is smaller in size that the afore-mentioned plate-shaped elements, and still is capable of coping with the possible displacement in the direction of rotary axis. FIG. 13 shows, in a perspective view, the mechanism of the masking element 44 adjustable in two directions. The masking surface 46 composed of felt for absorbing the ghost image is fixed on a first support table 47 which in turn is supported by a second support table 48 so as to be displaceable in either direction. Further said second support table 48 is mounted, by means of a fixing element 49, on the shaft 45 so as to be displaceable along said shaft. Said support tables are respectively displaced in the horizontal and vertical directions by means of the respective adjust screws 50 and 51, and a conventional vernier mechanism for positioning a lens or prism can be satisfactorily employed for this purpose.

The above-mentioned masking elements can be made of any material capable of interrupting the laser beam, preferably of a laser-absorbing color such as black. In case the laser beam is provided with a very high power, it becomes necessary to construct said masking element from a material, such as metal, capable of resisting the heat resulting from the laser beam.

The ghost image explained before results not necessarily from a lens of 'f — θ' characteristics but also from ordinary condenser lenses or even from longitudinally elongated lenses such as cylindrical lenses. Thus the present invention is by no means limited to the shapes or species of the lens or the polygonal rotary mirror shown in the foregoing embodiments.

Thus the present invention enables, by means of eliminating the light leading to the formation of a stationary said ghost image, to prevent the formation of ghost image on the final image, and also eliminates, by means of separating the stationary ghost image from the scanning beam, the limitation in size of the recording medium resulting from the elimination of ghost image in a conventional manner.

What is claimed is:

1. A method of eliminating a ghost image in an image forming process wherein a recording medium is scanned with a light beam reflected by a polygonal rotary mirror, which comprises directing said light beam to said rotary mirror along a direction so that the angle θ between said direction and the rotary axis of said rotary mirror is not equal to 90° thereby displacing the ghost image formed on said recording medium to a position out of the scanning line on said recording medium.

2. A method of eliminating a ghost image according to claim 1 which comprises positioning said rotary axis perpendicular to the scanning line on said recording medium.

3. A method of eliminating a ghost image according to claim 1 which comprises positioning said rotary axis at an angle not equal to 90° with respect to the scanning line on said recording medium.

4. A method of eliminating a ghost image according to claim 1 which comprises providing a masking element in the proximity of said recording medium thereby interrupting the irradiation of said ghost image onto said recording medium.

5. A method of eliminating a ghost image according to claim 4 in which said masking element is an element elongated in a direction parallel to said scanning line.

6. A method of eliminating a ghost image according to claim 4 in which said masking element is an element provided in the irradiating position of said ghost image.

7. A method of eliminating a ghost image according to claim 4 in which said masking element is adjustable longitudinally and transversally with respect to the direction of said scanning line.

8. An apparatus for eliminating a ghost image in an image forming apparatus comprising:
    a rotary mirror for deflecting a light beam;
    a recording medium movable in association with said deflected light beam such that the light beam scans the recording medium; and
    means for directing said light beam at said rotary mirror in such a way that the angle $\theta$ between said light beam and the rotary axis of said rotary mirror is not equal to 90°.

9. An apparatus for eliminating a ghost image according to claim 8 further comprising a masking element positioned to receive the ghost image located out of the scanning line on said recording medium.

10. An apparatus for eliminating a ghost image in an image handling apparatus comprising:
    a rotary mirror for deflecting a light beam;
    light beam receiving means located at a position to be scanned by said deflected light beam; and
    means for directing said light beam at said rotary mirror in such a way that the angle $\theta$ between said light beam and the rotary axis of said rotary mirror is not equal to 90°.

11. An apparatus for eliminating a ghost image according to claim 10 in which said light beam directing means comprises a light beam reflecting element.

12. An apparatus for eliminating a ghost image according to claim 10 further comprising a masking element provided in the proximity of said light beam receiving means for interrupting the irradiation of said ghost image onto said light beam receiving means.

13. An apparatus for eliminating a ghost image according to claim 12, in which said masking element is an element elongated in a direction parallel to the scanning line of said deflected light beam.

14. An apparatus for eliminating a ghost image according to claim 12 in which said masking element is an element provided in the irradiating position of said ghost image.

15. An apparatus for eliminating a ghost image according to claim 12 in which said masking element is an element which is adjustable with respect to the direction of said deflected light beam.

16. An apparatus for eliminating a ghost image in an image handling apparatus comprising:
    a light beam deflecting means having at least two reflecting surfaces and rotatably or reciprocatingly movable around an axis;
    a light beam receiving means having a surface to be scanned by said deflected light beam; and
    means for directing said light beam at said light beam deflecting means in such a way that the angle $\theta$ between said light beam and the axis of said deflecting means is not equal to 90°.

17. An apparatus for eliminating a ghost image in an image handling apparatus comprising:
    means for reflecting a light beam, having at least two non-parallel reflecting surfaces and movable about a fixed shaft;
    light beam receiving means having a surface to be scanned by the light beam reflected by said reflecting means; and
    means for displacing any light reflected by said light receiving means and re-reflected by said reflecting means away from the scanning line formed by said reflected light beam.

* * * * *